United States Patent [19]
Yoshida et al.

[11] Patent Number: 6,134,371
[45] Date of Patent: Oct. 17, 2000

[54] OPTICAL FIBER FIXING MEMBER, OPTICAL FIBER ARRAY, OPTICAL WAVEGUIDE MODULE AND METHOD OF MEASURING DIMENSIONAL ACCURACY OF OPTICAL FIBER FIXING MEMBER

[75] Inventors: Masahiro Yoshida, Hidaka; Teruo Yamashita, Akishima, both of Japan

[73] Assignee: Hoya Corporation, Japan

[21] Appl. No.: 09/153,135

[22] Filed: Sep. 15, 1998

[30] Foreign Application Priority Data

Sep. 18, 1997 [JP] Japan ................................. 9-253053
Sep. 7, 1998 [JP] Japan ................................ 10-252454

[51] Int. Cl.$^7$ .................................................. G02B 6/00
[52] U.S. Cl. ............................ 385/137; 385/59; 385/65; 385/83
[58] Field of Search ............................... 385/137, 59, 65, 385/83, 85, 88, 49

[56] References Cited

U.S. PATENT DOCUMENTS 5,533,158 7/1996 Han et al. ................................. 385/88
5,835,659 11/1998 Ota et al. ................................ 385/137

FOREIGN PATENT DOCUMENTS

729044A2 8/1996 European Pat. Off. .
854372A1 7/1998 European Pat. Off. .

OTHER PUBLICATIONS

European Search Report re EP application No. 98117760.3, dated May 7, 1999.
European Search Report re EP application No. 98117760.3, dated Jul. 16, 1999.

*Primary Examiner*—Phan T. H. Palmer
*Attorney, Agent, or Firm*—Cook, Alex, McFarron, Manzo, Cummings & Mehler, Ltd.

[57] ABSTRACT

An optical fiber fixing member 11 including an optical fiber engaging portion 15 for positioning/engaging an optical fiber F. The optical fiber engaging portion 15 is provided with two inclined faces 12, for supporting a side wall of the optical fiber when the optical fiber F is engaged in the optical fiber engaging portion 15, and a bottom face 13 positioned between the inclined faces 12. The bottom face 13 is flat. Additionally, in a sectional face perpendicular to an optical axis of the optical fiber F supported by the inclined faces 12, in a boundary portion in which the bottom face 13 and the inclined faces 12 are connected, inclinations of the bottom face 13 and the inclined faces 12 are discontinuous. Therefore, when the optical fiber engaging portion 15 is observed while a light is radiated to the bottom face 13 from above or from below, the contrast between the bottom face 13 and the inclined face 12 by a reflected light or a transmitted light is enhanced.

12 Claims, 6 Drawing Sheets

OPTICAL FIBER FIXING MEMBER, OPTICAL FIBER ARRAY, OPTICAL WAVEGUIDE MODULE AND METHOD OF MEASURING DIMENSIONAL ACCURACY OF OPTICAL FIBER FIXING MEMBER

REFERENCE TO RELATED APPLICATIONS

This application claims the priority rights under 35 U.S.C. 119 of Japanese Patent Application Nos. Hei 9-253053 filed on Sep. 18, 1997 and Hei 10-252454 filed on Sep. 7, 1998, the entire disclosure of each is incorporated herein by reference.

BACKGROUND OF THE INVENTION (i) Field of the Invention

The present invention relates to an optical fiber fixing member for positioning/engaging optical fiber end portions, an optical fiber array in which the optical fiber end portions are positioned/fixed, an optical waveguide module, and a method of measuring dimensional accuracy of the optical fiber fixing member.

(ii) Description of the Related Art

An optical fiber fixing member is used in a member for positioning/fixing light input/output ends of optical fibers with high accuracy. Such an optical fiber fixing member, for example, is disclosed as a substrate for fixing the optical fiber in Japanese Patent Application Laid-open No. 292332/1996 (hereinafter referred to as "the publication"). Fixing grooves for receiving and positioning the optical fibers are formed in a surface of the board by press molding. Each fixing groove has a V-shaped sectional configuration, and its bottom face is pointed or flat. The publication further discloses an optical fiber array in which the optical fibers are contained in the fixing grooves and pressed with a lid.

After the optical fiber fixing member is prepared by grinding processing, press molding, or another method, the optical fiber engaging portions for positioning/engaging optical fiber end portions need to be examined to determine if they are formed within a predetermined accuracy. For example, in a case where a plurality of optical fibers are positioned/engaged and aligned, if the accuracy in the pitch of the optical fiber engaging portions is not within the predetermined range, they cannot be used in an optical fiber array where a low optical connection loss is demanded. Examples of a conventional method of measuring a pitch dimensional accuracy include an optical measuring method in which the accuracy is measured from an image with a measuring microscope or the like, and a stylus type measuring method in which a configuration measuring device using a stylus is employed.

(1) In a case where the pitch dimension of each optical fiber engaging portion is measured from an image with a measuring microscope or the like, for example, a method of measuring a pitch or the like between the centers of bottom faces of adjoining optical fiber engaging portions can be used.

However, if the bottom face of the optical fiber engaging portion is pointed as disclosed in the publication, it is difficult to obtain a contrast of the image for detecting a center position of the bottom face of the optical fiber engaging portion. Moreover, even when the bottom face of the optical fiber engaging portion is flat as disclosed in the publication, it is difficult to distinguish the inclined faces and the flat bottom face constituting the fixing groove by image processing if the bottom face is coarse. Therefore, pitches cannot be automatically measured by image processing with a measuring microscope or the like.

For example, if the bottom face is pointed, inclined faces of the optical fiber engaging portion for supporting a side wall of the optical fiber directly abut on each other. Therefore, it is difficult to automatically bring a boundary line between the inclined faces into focus. At the time of observation with the microscope, reflectances of the two inclined faces relative to a light are so close to each other that the boundary line between the inclined faces is not apparent. Moreover, even if the boundary line can be observed with the naked eye, a processing streak on the inclined face is frequently mistaken for the boundary line in the detection of the boundary line by the image processing.

On the other hand, in a case where the bottom face is flat but coarse, light is irregularly reflected by the bottom face. Therefore, both the bottom face and the inclined face are reflected rather than white, and the boundary between the bottom face and each inclined face provides little contrast. Moreover, when the boundary between the bottom face and each inclined face is constituted by a moderate curved face, the boundary between the bottom face and each inclined face provides little contrast, and it is even more difficult to distinguish the boundary from the image.

As aforementioned, there is a problem in that the center position of the optical fiber engaging portion cannot be easily found when the image exhibits a low contrast between the flat bottom face and the inclined face and when the boundary line between the bottom face and the inclined face is unclear.

(2) In the measuring method in which a stylus type configuration measuring device is used, the surface of the optical fiber engaging portion is traced perpendicularly to a groove direction (an optical axis of the engaged optical fiber), with a stylus having a tip-end radius of about 1 to 30 µm, to first measure an outline sectional configuration of the optical fiber engaging portion. Subsequently, the obtained outline sectional configuration is analyzed with analysis software to obtain accuracy in the pitch and depth of the optical fiber engaging portion.

To accurately measure pitches, however, the squareness of the groove direction of the optical fiber engaging portion (the optical axis direction of the optical fiber, the extending direction of the optical fiber engaging portion) needs to be accurately adjusted to that of the measuring direction (the scanning direction of the stylus).

If the squareness adjustment is not performed accurately, the pitch is measured larger only by $\Delta P = P((1/\cos \Delta\theta)-1)$, in which $\Delta P$ represents a pitch error, $\Delta\theta$ represents an angle deviated from the right angle, and P represents a true pitch. For example, in a general optical fiber fixing member having eight V-shaped grooves at 250 µm pitches, an accumulated pitch is 250×7=1750 µm. Therefore, even if $\Delta\theta$ is one degree, the pitch is measured as larger by 0.27 µm. In a fixing member for single-mode optical fibers, since the latest allowable pitch error is ±0.5 µm or less, an error of 0.27 µm in the measurement is not acceptable. Contrarily, to set the allowable error to 0.1 µm or less in the measurement, the error of squareness has to be set to 0.64 degrees or less.

As aforementioned, even in the accuracy measurement by the stylus type configuration measuring device, the scanning direction of the stylus needs to be accurately adjusted. Therefore, when the position of the groove bottom face of the optical fiber engaging portion is not easily detected, the adjustment of the stylus scanning direction requires much labor. Moreover, in order to realize automation of scanning direction adjustment, the position of the groove bottom face of the optical fiber engaging portion needs to be detected with high contrast on the observed image.

(3) The problems described above also arise when the optical fibers are engaged in the optical fiber engaging portions to assemble an optical fiber array. For example, when the optical fiber is engaged in the optical fiber engaging portion, the vicinity of the optical fiber engaging portion is observed from above and enlarged with a microscope or the like and, for example, an optical fiber position is finely regulated with a precision stage in such a manner that the optical axis of the optical fiber is positioned in the center of the optical fiber engaging portion. In this case, with the conventional optical fiber fixing member, the center position of the optical fiber engaging portion is not clear. This is especially true when a multi-core optical fiber is engaged, as much labor is necessary. To automate the operation of engaging the optical fiber in the optical fiber engaging portion, the center position of the optical fiber engaging portion needs to be recognized by the image processing. However, since the image processing is inferior in boundary detecting capability to the naked eye, the contrast in the boundary portion needs to be raised.

(4) Furthermore, after the optical fiber array constituted by the optical fiber fixing member, the optical fibers and a lid is assembled, in some cases it needs to be examined whether the optical axis of the optical fiber extends along the center of the optical fiber engaging portion in the input/output end portion of the optical fiber and the vicinity of an end portion extending along the optical fiber. In this case, if either the optical fiber fixing member or the lid is transparent, the vicinity of the optical fiber engaging portion in which the optical fiber is engaged/fixed can be observed by a microscope. However, in the conventional optical fiber array, since the center of the optical fiber engaging portion, as a reference, cannot easily be recognized as aforementioned, much labor is necessary for high-precision examination of positional accuracy.

SUMMARY OF THE INVENTION

The present invention has been developed against the background described above, and an object thereof is to provide an optical fiber fixing member in which a center position of an optical fiber engaging portion is obtained with high precision by a microscope or the like and, as a result, accuracy of the optical fiber engaging portion can be precisely measured with a measuring microscope or a stylus type configuration measuring device, so that an optical fiber array can be easily manufactured.

Another object of the present invention is to provide an optical fiber array where easy examination can be conducted as to whether an optical fiber is positioned in the center of an optical fiber engaging portion of an optical fiber fixing member is in the vicinity of an input/output end portion of the optical fiber.

A further object is to provide an optical waveguide module provided with the optical fiber array.

Still a further object is to provide a method for measuring dimensional accuracy of the optical fiber fixing member.

The inventors of the present application have found that, to achieve the above objects, when the optical fiber engaging portion of the optical fiber fixing member is irradiated with a light, the intensity of a light reflected or transmitted by a bottom face of the optical fiber engaging portion needs to have a large difference from the intensity of a light reflected or transmitted by an inclined face for supporting a side wall of the optical fiber and that the intensity of the reflected light or the transmitted light needs to rapidly change around the boundary between the bottom face and the inclined face of the optical fiber engaging portion.

Consequently, the present invention has been developed based on such finding.

According to one aspect of the present invention, there is provided an optical fiber fixing member for positioning/engaging an optical fiber end portion, which comprises an optical fiber engaging portion having two inclined faces for supporting a side wall of the optical fiber end portion and a bottom face positioned between the two inclined faces. The bottom face is flat, and in a sectional face vertical to an optical axis of an optical fiber supported by the inclined faces, at a portion where the bottom face and the inclined faces are connected, inclinations of the bottom face and the inclined faces are discontinuous.

According to another aspect of the present invention, there is provided an optical fiber fixing member for positioning/engaging an optical fiber end portion, which comprises an optical fiber engaging portion having two inclined faces for supporting a side wall of the optical fiber end portion and a bottom face positioned between the two inclined faces. The bottom face is flat. A reflective film and/or a reflection preventive film is selectively formed on the inclined faces and the bottom face in such a manner that, when the optical fiber engaging portion is observed while a light is radiated to the bottom face from above or from below, contrast of the bottom face and the inclined faces by a reflected light or a transmitted light is enhanced.

According to a further aspect of the present invention, there is provided an optical fiber fixing member for positioning/engaging an optical fiber end portion, which comprises an optical fiber engaging portion having two inclined faces for supporting a side wall of the optical fiber end portion and a bottom face positioned between the two inclined faces. The bottom face is flat, and has a surface roughness Ra of 1.0 µm or less.

According to another aspect of the present invention, there is provided an optical waveguide module which comprises an optical fiber array provided with the above optical fiber fixing member, an optical fiber engaged in an optical fiber engaging portion of the optical fiber fixing member and with a lid for pressing a side wall of the optical fiber engaged in the optical fiber engaging portion to hold the optical fiber end portion together with the optical fiber fixing member, wherein at least one of the optical fiber fixing member and the lid is transparent; and an optical waveguide element optically connected to the optical fiber array.

According to another aspect of the present invention, there is provided an optical measurement method for measuring dimensional accuracy of an optical fiber fixing member, in which contrast of an observed image of an inclined face and a bottom face of an optical fiber engaging portion of the optical fiber fixing member is used to distinguish a boundary position of the inclined face and the bottom face, and the pitches of two or more optical fiber engaging portions are measured based on the boundary position so as to measure the dimensional accuracy of the optical fiber engaging portion.

According to another aspect of the present invention, there is provided a stylus type measurement method for measuring dimensional accuracy of an optical fiber fixing member using a configuration measuring device, in which a part of the optical measurement method is incorporated. Contrast of an observed image of an inclined face and a bottom face of an optical fiber engaging portion of the optical fiber fixing member is used to distinguish the boundary position of the inclined face and the bottom face. An extending direction of the optical fiber engaging portion is obtained based on the boundary position. A measurement direction of the configuration measuring device is adjusted based on the obtained extending direction, and dimensional accuracy in the pitch and/or depth of two or more optical fiber engaging portions is measured based on an outline sectional configuration of the optical fiber engaging portions which is obtained by tracing the optical fiber engaging portion in the adjusted measurement direction with a stylus.

Additionally, to trace the optical fiber engaging portion with the stylus, a fixing base, to which the optical fiber fixing member is fixed, may be moved, or the stylus of the configuration measuring device may be moved.

BRIEF DESCRIPTION OF THE DRAWINGS

FIGS. 3A–3D are a process diagram showing a method of manufacturing the optical fiber fixing member by a mold for molding the optical fiber fixing member of the embodiment.

FIGS. 5A–5B are explanatory view showing an optical fiber array of an embodiment.

DETAILED DESCRIPTION OF THE PREFERRED EMBODIMENTS

Preferred embodiments of the present invention will now be described.

An optical fiber fixing member of the present invention has on its surface an optical fiber engaging portion for positioning/engaging an optical fiber end portion. The optical fiber engaging portion includes two inclined faces for supporting a side wall of an optical fiber when the optical fiber end portion is engaged, and a flat bottom face positioned between the two inclined faces and not on the optical fiber.

Here, the optical fiber engaging portion is typically configured to have a concave portion. The two inclined faces forming opposed faces of the concave portion for supporting the side wall of the optical fiber end portion are inclined in such a manner that an interval between the opposed faces is gradually narrowed from an upper portion toward a bottom of the concave portion. The bottom of the concave portion at which the inclined faces are terminated forms the bottom face.

According to a first aspect of the present invention, in a sectional face perpendicular to an optical axis of the optical fiber supported by the two inclined faces of the optical fiber engaging portion, in a portion where the bottom face and the inclined faces are connected (i.e., in a boundary of the bottom face and the inclined faces), inclinations of the bottom face and the inclined faces are discontinuous, and the bottom face and the inclined face are not connected by a circular arc.

In such a case, the inclined face of the optical fiber engaging portion is steeply raised from the flat bottom face. When light is radiated from one direction, a direction in which the light is reflected by the bottom face does not coincide with a direction in which the light is reflected by the inclined face. When the reflection direction is observed along the bottom face and the inclined face with the naked eye, the reflection direction rapidly changes in the boundary between the bottom face and the inclined face.

When light is radiated perpendicularly to the flat bottom face and the light reflected by each portion of the optical fiber fixing member is observed from the light radiation direction, the intensity of the light reflected by the bottom face of the optical fiber engaging portion is high by regular reflection, while the intensity of the light reflected by the inclined face is low because the light incident direction does not coincide with the reflection direction.

Furthermore, when the optical fiber engaging portion is observed from a vertical direction relative to the bottom face by the microscope, light can be radiated to the bottom face from the vertical direction by falling lighting. In this case, however, when the bottom face is in focus for a microscope, a focal depth of the microscope is rapidly deviated from the boundary of the bottom face and the inclined face toward the inclined face, and only the flat bottom face is clearly observed. In this manner, a boundary line between the bottom face and the inclined face can be recognized.

On the other hand, in the sectional face perpendicular to the optical axis of the optical fiber supported by the two inclined faces of the optical fiber engaging portion, in the portion where the bottom face and the inclined face are connected, the inclination continuously changes from the bottom face toward the inclined face. Specifically, in the optical fiber engaging portion in which the flat bottom face is connected to the inclined face by a circular arc, when light is radiated as aforementioned, the brightness/darkness of the bottom and inclined faces is generated, but the boundary therebetween is dimmed, and the boundary line cannot be distinguished.

According to a second aspect of the present invention, a reflective film and/or a reflection preventive film is selectively formed on the inclined face and the bottom face in such a manner that, when the optical fiber engaging portion is observed while light is radiated to the optical fiber engaging portion from above or from below relative to the flat bottom face of the optical fiber engaging portion, the contrast between the bottom face and the inclined face is enhanced. Light may be radiated to the bottom face from a vertical direction or from an oblique direction.

This aspect includes an optical fiber engaging portion which is configured to provide high contrast as aforementioned in the first aspect, an optical fiber engaging portion in which the reflective film is selectively formed only on the bottom face by lithography or another method, an optical fiber engaging portion in which the reflection preventive film is selectively formed on a portion other than the bottom face, an optical fiber engaging portion in which only the intensity of the light reflected by the bottom face is enhanced by using both the reflective film and the reflection preventive film, and the like. When the reflective film or the reflection preventive film is used, the inclinations of the bottom and inclined faces may be discontinuous in the boundary of the bottom face and the inclined face.

According to a third aspect of the present invention, surface roughness of the flat bottom face of the optical fiber engaging portion is set to Ra of 1.0 μm or less. By reducing the surface roughness of the bottom face, the irregular reflection on the bottom surface is decreased, and the contrast between the inclined and bottom faces can be enhanced. On the other hand, when the surface roughness of the bottom face is reduced, light scattering on the surface is decreased, and the amount of light transmitted to the bottom face of the optical fiber fixing member is increased. Therefore, by using a surface having a high reflectance as the surface on which the optical fiber fixing member is mounted, only the bottom face can be lightened by the light reflected/returned from the mounting surface. Contrarily, when a black surface with a low reflectance is used as the surface on which the optical fiber fixing member is mounted, only the bottom face turns black, while the inclined face can be reflected white through light scattering. Even in the third aspect, the inclinations of the bottom and inclined faces may be discontinuous in the boundary between the bottom face and the inclined face.

As aforementioned, in the case where light transmission on the bottom face is used, in order to enhance the contrast, it is preferable not to transmit the light reflected by the bottom surface directly into the microscope or the like. Specifically, the lighting direction is preferably deviated from the observation direction of the microscope or the like. When dimensions are measured directly from an image as in the measuring microscope, in order to prevent the observed image from being distorted, the bottom face needs to be observed from the vertical direction. Therefore, the lighting direction is preferably deviated from the vertical axis.

On the other hand, in a case where the observation from the vertical direction is obstructed by the stylus and cannot be easily performed as in the stylus type configuration measuring device, the bottom face may be observed from the oblique direction. In this case, the observation direction is preferably inclined by 30 to 70 degrees relative to the bottom face to enhance the contrast of the inclined face and the bottom face.

As aforementioned, the smaller the surface roughness of the bottom face of the optical fiber engaging portion is, the more preferable. Further, it has been found that a practical contrast can be obtained with a surface roughness Ra of 1.0 μm or less while an excellent contrast can be obtained with Ra of 0.5 μm or less.

Additionally, the first aspect and the second aspect, the first aspect and the third aspect, the second aspect and the third aspect, and the first aspect, the second aspect of the present invention and the third aspect can be combined. For example, in the optical fiber fixing member which is constituted by combining the first and second aspects, or in the optical fiber fixing member which is constituted by combining the first and third aspects, the bottom face and the inclined face of the optical fiber engaging portion are in high contrast, and the boundary line can clearly be distinguished.

Furthermore, when an open angle of two inclined faces for supporting the side wall of the optical fiber end portion is set to a range from 50 to 100, preferably 50 to 90 degrees, the optical fiber engaging portion is observed with the microscope. In this case, if the bottom face of the optical fiber engaging portion is in focus, the inclined face close to the boundary from the bottom face is deviated from the focal depth and dimmed, and only the bottom face can clearly be observed.

Moreover, in a case of an optical fiber fixing member having a plurality of optical fiber engaging portions, flat bottom faces of the optical fiber engaging portions are preferably positioned on the same plane. In the optical fiber fixing member, when a plurality of optical fiber engaging portions are brought into a visual field of the microscope, each bottom face can be in focus. Therefore, a pitch interval between centers of adjoining optical fiber engaging portions can easily be measured/evaluated.

Examples of a material of the optical fiber fixing member include a glass, a glass-ceramic, a polymer(e.g., resin), and other finely processable or moldable materials. Furthermore, a transparent glass is preferable because the optical fiber engaging portion can be observed from the underside, and a glass with a low thermal expansion coefficient is especially preferable. Examples of a processing method include grinding processing, molding, and the like. Especially, in a case of molding, a mold having a reverse configuration relative to the configuration of the optical fiber engaging portion to be molded can be used as a mold for transferring the optical fiber engaging portion. In this case, at least a molding face of the mold for transferring the bottom face of the optical fiber engaging portion is preferably flattened and further smoothed.

For example, in a case where a molded material having a smooth surface is ground/processed by a grindstone, molded faces to which the inclined faces of the optical fiber engaging portion are transferred are processed with the grindstone, and a part of the smooth surface of the molded material is left between the molded faces as a molded face to which the bottom face of the optical fiber engaging portion is transferred. In this method, after the molded faces to which the inclined faces are transferred are processed, the molded face to which the bottom face of the optical fiber engaging portion is transferred does not need to be processed in a separate process. Moreover, since the molded faces to which the bottom faces of the optical fiber engaging portions are transferred are on the same plane, the heights of the molded faces do not need to be matched. Furthermore, a sharp edge is formed between the molded face to which the bottom face is transferred and the molded face to which the inclined face is transferred, and the edge portion forms the boundary line between the bottom face and the inclined face of the optical fiber engaging portion.

In a case of molding, a material glass preferably has a low softening point and a small average thermal expansion coefficient between a molding temperature and a room temperature. Examples of such glass include $SiO_2$, $B_2O_3$ and ZnO. For the molding, a method of preparing a usual high-precision molded product is used. Grinding processing is inferior to the molding in mass productivity, but can be performed. In the grinding processing, the bottom face of the optical fiber engaging portion is preferably smoothed by the grindstone for finishing a smooth surface.

When a transparent material is used in the aforementioned optical fiber fixing member, the optical fiber is engaged in the optical fiber engaging portion, the optical fiber is pressed by a lid from above, and the optical fiber end portion is held by the lid and the optical fiber fixing member, then an optical fiber array can be obtained. In the optical fiber array, the optical fiber engaging portion and the optical fiber end portion engaged/fixed in the optical fiber engaging portion can be observed by the microscope from the underside of a face on which the optical fiber engaging portion is formed. When observation is performed from the vertical direction relative to the bottom face of the optical fiber engaging portion, the bottom face of the optical fiber engaging portion can clearly be distinguished as aforementioned. Therefore, not only can an optical fiber end face can be examined, but it also can easily be examined even if optical fiber end portions arranged in the end face are accurately engaged/fixed in the optical fiber engaging portions. For the lid, for example, a plate material formed of the glass or another material for use in the optical fiber fixing member can be used.

A portion of the lid which abuts the optical fiber side wall is preferably flat in such a manner that the optical fiber side wall can be securely pressed.

At the time of assembly of the optical fiber array, for example, the optical fiber end portion is engaged in the optical fiber engaging portion, an adhesive of a photo-setting resin, a thermal-setting resin, or the like is applied thereto, and the optical fiber side wall engaged in the optical fiber engaging portion is pressed with the lid in such a manner that the optical fiber is held by the lid and the optical fiber fixing member. In this condition, the adhesive is set, and the optical fiber end portion is fixed to the optical fiber fixing member. In the present invention, the material of the optical fiber fixing member or the lid is not limited to a transparent material, but the use of transparent material is preferable so that the engaged/fixed optical fiber end portion is observed as aforementioned, and ultraviolet radiation is performed to cure the photo-setting resin.

In the optical fiber array in which the adhesive is applied partially or entirely in the space surrounded by at least two members of the optical fiber engaging portion, the optical fiber, and the lid, if the reflectance is large on the bottom surface of the optical fiber engaging portion, it is easy to distinguish the bottom face. Therefore, a difference in reflectance between the adhesive and the optical fiber fixing member is preferably large. After the optical fiber array is assembled, the end face of the optical fiber array on the optical connection side is abraded.

When the aforementioned optical fiber array is used to be optically connected to an optical waveguide element, an optical waveguide module can be obtained. Examples of the optical waveguide element include a branch type optical waveguide element, an optical waveguide element provided with a light receiving element, a light emitting element and another optical element, and the like. Furthermore, there is an optical waveguide module in which optical fiber arrays are optically connected via the optical waveguide element, at least one of the optical fiber arrays being the optical fiber array of the present invention.

Examples of the present invention will be described hereinbelow.

FIRST EXAMPLE

A carbide mother material mainly composed of tungsten carbide was precision-processed to obtain a carbide block provided with a base having a plane dimension of width 5 mm, length 5 mm and height 14 mm. Additionally, only a top surface of the carbide block was surface-processed to provide a surface roughness Ra of 0.04 $\mu$m. Nine V-shaped grooves having an open angle of 60 degrees were processed at 250 $\mu$m intervals on the top surface of the carbide block using a dicing saw and a diamond grindstone in such a manner that they are arranged in the center of the 5 mm width. At the time of processing, the V-shaped groove depth was set in such a manner that an unprocessed face (the top surface described above) having a width of about 20 $\mu$m is left between the adjoining V-shaped grooves.

Figure 2:
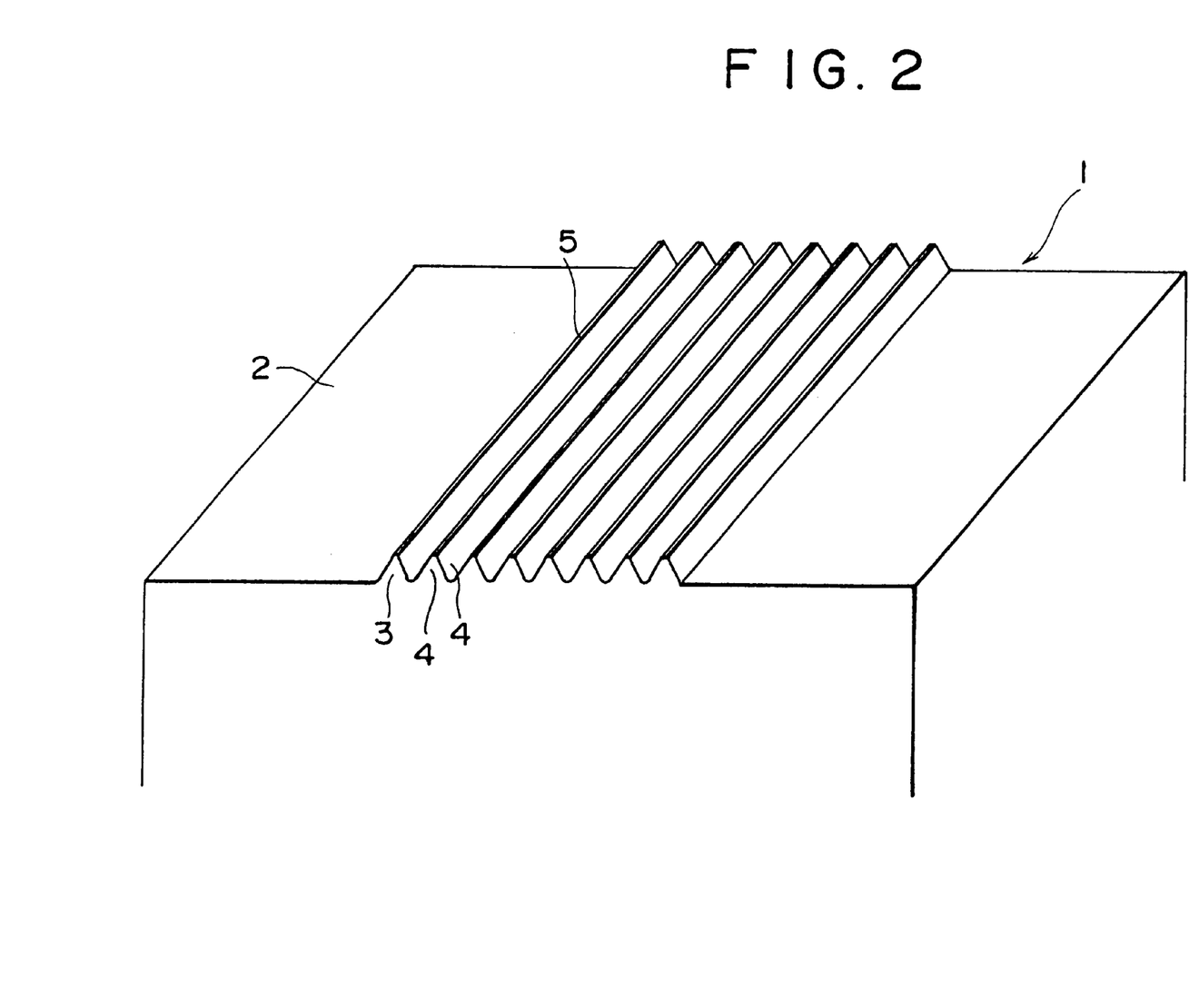
FIG.2 is a perspective view of a concave/convex groove mold for molding a V-shaped groove of the embodiment as seen obliquely from above.
Figure 3A:
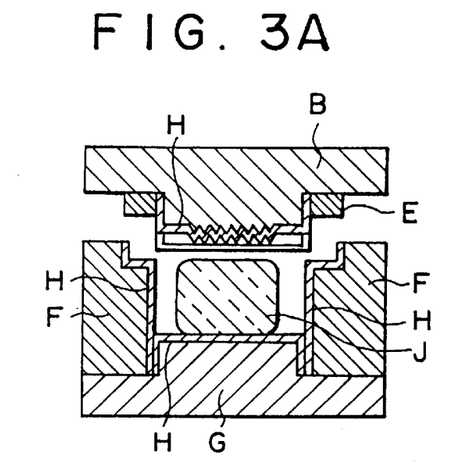
FIG. 3A is a front sectional view before pressing.
Figure 3B:
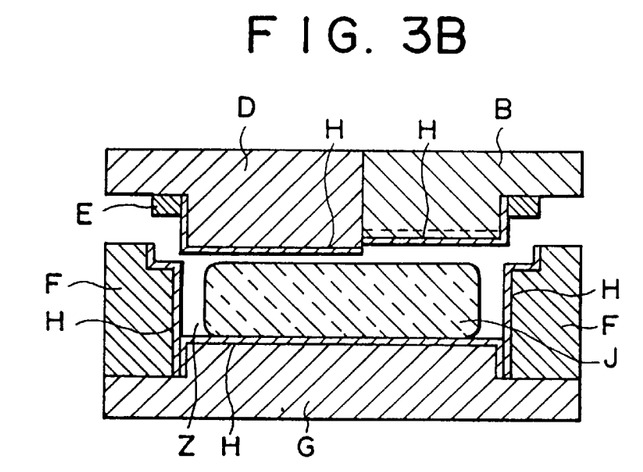
FIG. 3B is a side sectional view of FIG. 3A.
Figure 3C:
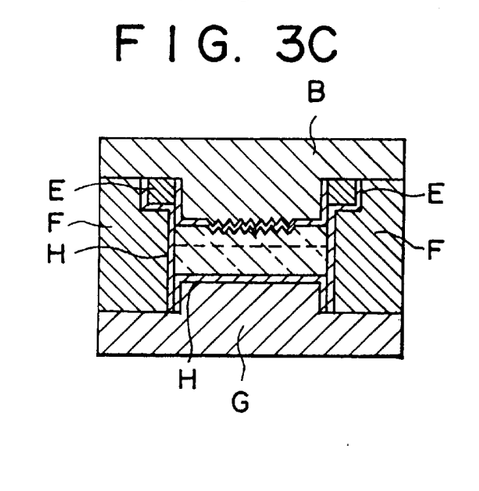
FIG. 3C is a front sectional view during pressing.
Figure 3D:
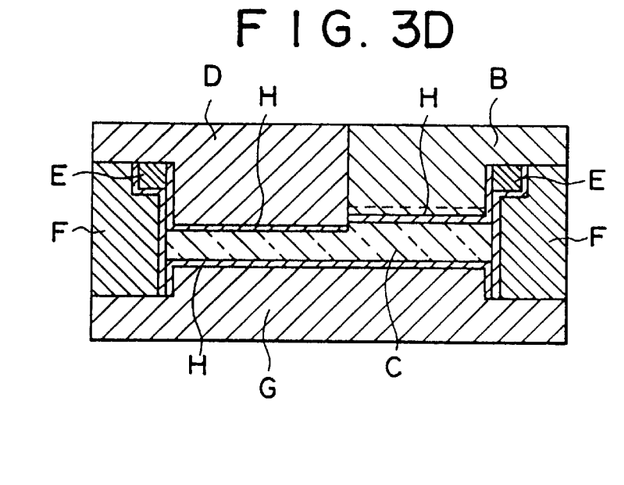
FIG. 3D is a side sectional view of FIG. 3C.

Subsequently, plane processing was performed from the bottom faces of the V-shaped grooves on opposite ends toward the outside of the V-shaped grooves in the same depth as the depth of the V-shaped groove, so that a mold 1 for molding V-shaped grooves was obtained which has on a plane 2 concave/convex grooves 4 with eight stripes 3, each having a triangular protruded configuration arranged thereon.

By the method of preparing the mold, a flat portion 5, having a width of about 20 $\mu$m and a surface roughness Ra of 0.04 $\mu$m, is formed on a tip end of each concave/convex groove 4 of the V-shaped groove molding mold 1.

By combining the V-shaped groove molding mold with other mold components, a mold for molding the optical fiber fixing member was constituted as shown in FIG. 3. Specifically, the V-shaped groove molding mold B described above and a mold D for transferring/forming a base portion on which an optical fiber covering portion is laid, were used. The V-shaped groove molding mold B and the mold D were integrally combined by a fixing frame E to constitute an upper mold. Additionally, a drum mold F for forming the side wall of the optical fiber fixing member and a lower mold G for molding the bottom face of the optical fiber fixing member, were used to constitute a cavity Z.

To provide mold release characteristics, 500 angstroms of carbonic mold release film H were formed beforehand on the molded face of each mold by an ion plating method.

Subsequently, a glass material was hot-preformed which contains 13.3 wt % of $SiO_2$, 32.2 wt % of $B_2O_3$, 44.5 wt % of ZnO, 5.5 wt % of $Al_2O_3$, and 4.5 wt % of $Li_2O$ and further contains 0.1 wt % of $SnO_2$ in outer percentage, to obtain a glass preform J whose ridge has a curved face and which has a width of 3.8 mm, a length of 10.5 mm and a thickness of 2.05 mm. The glass preform J was disposed in the cavity Z of the mold as shown in FIG. 3. While the mold was heated to 560° C. in an inert atmosphere, pressure of 150 kgf/cm$^2$ was applied with the mold, to press-mold the glass preform J for 90 seconds. Thereafter, by weakening the applied pressure, the mold was cooled to room temperature, and a molded material C was taken out of the mold.

Figure 4:
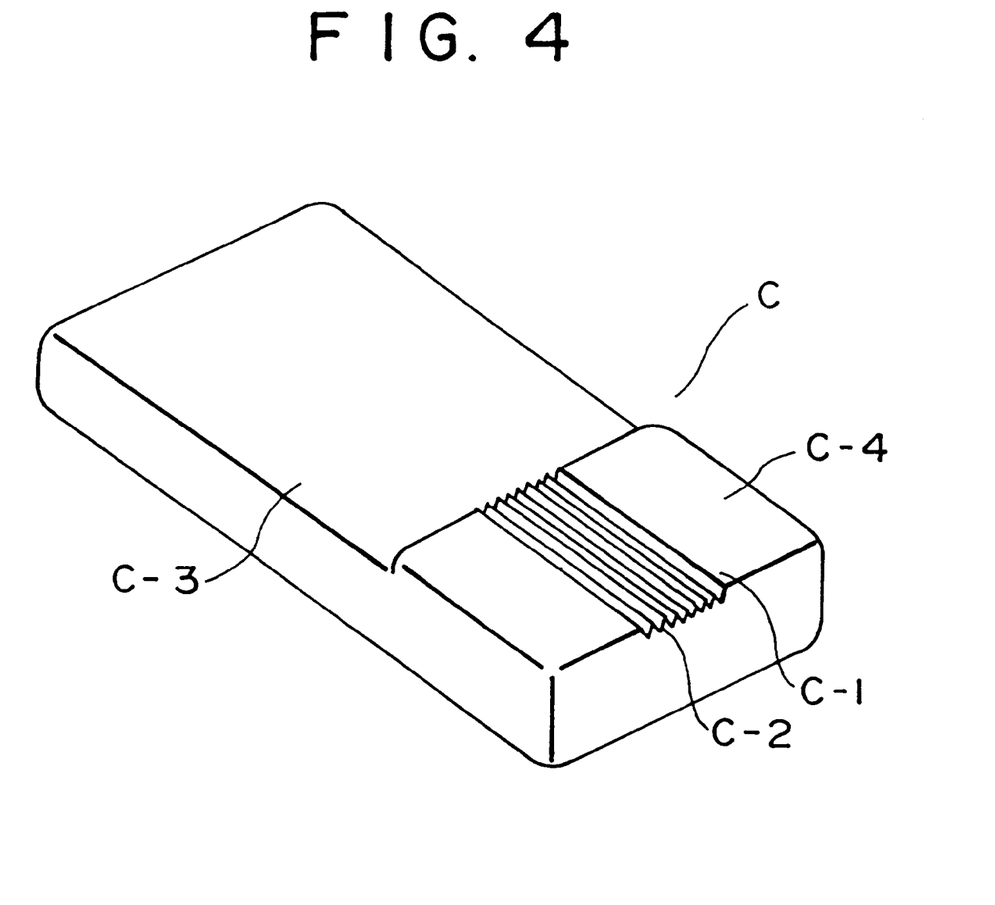
FIG. 4 is a perspective view of the optical fiber fixing member according to the embodiment.

As shown in FIG. 4, eight V-shaped grooves C-2 constituting an optical fiber engaging portion C-1 are molded at 250 $\mu$m pitches on a top surface of the molded material or optical fiber fixing member C. Moreover, a face C-3 on which an optical fiber covering portion is laid is molded lower than a V-shaped groove molded face C-4.

Figure 1:
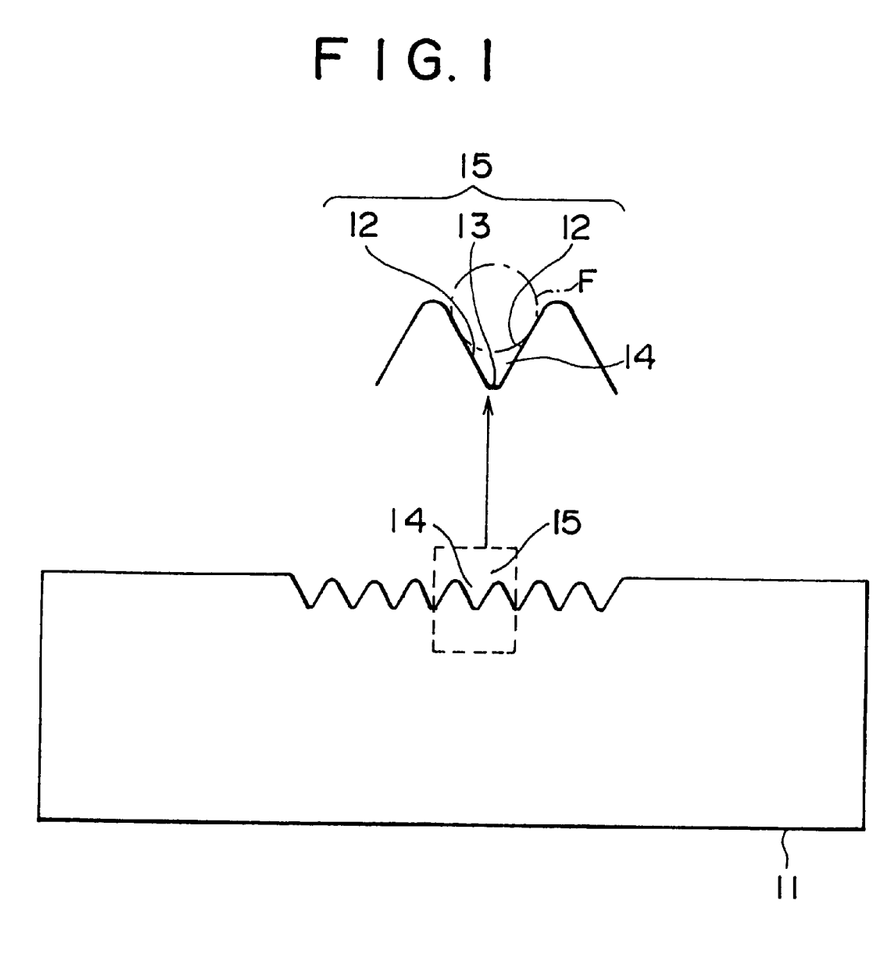
FIG. 1 is a transverse sectional view in an optical fiber engaging portion of an optical fiber fixing member according to an embodiment of the present invention.

As shown in FIG. 1, there is a plane portion (flat portion) of a width of about 20 $\mu$m in a bottom face 13 of a V-shaped groove 14. When the surface roughness of the V-shaped groove 14 was measured with a surface roughness meter with a stylus tip-end diameter of 5 $\mu$m, the surface roughness Ra of the V-shaped groove bottom face 13 was 0.04 $\mu$m. Specifically, it has been found that the flat face of the V-shaped groove bottom face 13 is formed by transferring the flat portion 5 on the tip end of the concave/convex groove 4 shown in FIG. 2, and molded in the same surface roughness as that of the flat portion 5 of the mold 1. On the other hand, the surface roughness of an inclined face 12 of the V-shaped groove 14 was measured 0.2 $\mu$m in Ra. Moreover, in a portion where the V-shaped groove bottom face 13 and the inclined faces 12 are connected, the inclinations of the V-shaped groove bottom face 13 and the inclined faces 12 are discontinuous in a sectional face vertical to a direction in which the optical fiber engaging portion extends. Furthermore, when light was radiated to an optical fiber engaging portion 15 from above or from below, the contrast of the V-shaped groove bottom face 13 and the inclined faces 12 could clearly be distinguished by the naked eye.

The accuracy of the V-shaped groove of the optical fiber fixing member was measured as follows:

A magnification of a measuring microscope was set to 100 times on a screen, and an image seen from the vertical direction relative to the V-shaped groove bottom face 13 of the optical fiber fixing member 11 was fetched. Additionally, a halogen lamp was used as a lighting source. To prevent the temperature from being raised by the lighting, heat rays were cut by a heat ray absorbing filter. The V-shaped groove bottom face of the optical fiber fixing member 11 was irradiated from the vertical direction, and was brought into focus. Subsequently, opposite edges of the V-shaped groove bottom face (boundaries between the bottom face and the inclined faces) were automatically detected by image processing, and an intermediate position between the opposite edges was calculated to obtain the center position of the V-shaped groove bottom face 13. The similar operation was repeatedly applied to the V-shaped grooves 14. By measuring a distance between the center positions of the V-shaped groove bottom faces 13, the pitch accuracy of the V-shaped groove 14 was measured. In the optical fiber fixing member 11 of the embodiment, the V-shaped groove bottom face was different in brightness of the image from the inclined faces. Therefore, the opposite edges of the V-shaped groove bottom face could accurately and easily be detected automatically from the contrast. As a result, in the V-shaped groove pitch measurement, an analysis error in the same measured image was within about 0.1 µm.

The case where the glass material was used has been described above, but the same can apply to a case where a transparent polymer material in a set condition is used.

By forming films on the optical fiber engaging portion of the optical fiber fixing member as described in following (1) to (3), the contrast of the inclined face and the bottom face can be enhanced:

(1) forming either a reflective film or a reflection preventive film on either the inclined face or the bottom face;

(2) forming the reflection preventive film on the inclined face and the reflective film on the bottom face; and (3) forming the reflective film on the inclined face and the reflection preventive film on the bottom face.

SECOND EXAMPLE

The pitch accuracy of the V-shaped groove of the optical fiber fixing member according to the first example was measured using a measuring microscope as follows:

A metal mirror was laid on an observation base of the measuring microscope, and the optical fiber fixing member was mounted on the metal mirror. Additionally, light was radiated from above by 60 degrees relative to the V-shaped groove bottom face from a longitudinal direction of the V-shaped groove, so that a reflected light was prevented from directly entering an optical system of the measuring microscope. Observation was performed from the vertical direction relative to the V-shaped groove bottom face, and the bottom face was brought into focus. In the aforementioned arrangement, only the V-shaped groove bottom face of the optical fiber fixing member of the example was reflected brightly. When the V-shaped groove pitches were measured in the same manner as the first example, measurement could be taken with the similar measurement accuracy. In comparison by the naked eye, it was easier to distinguish the V-shaped groove bottom face as compared with the setting of the first example.

EXAMPLE 3

The V-shaped groove pitches were measured in the same manner as the second example except that a black-surface processed aluminum plate was laid on the observation base instead of the metal mirror and that the light intensity was slightly strengthened. In the aforementioned arrangement, only the V-shaped groove bottom face of the optical fiber fixing member of the example could be reflected black. When the V-shaped groove pitches were measured in the same manner as the first example, measurement could be taken with similar measurement accuracy. In comparison by the naked eye, it was easier to distinguish the V-shaped groove bottom face as compared even with the setting of the second example.

FOURTH EXAMPLE

The V-shaped groove accuracy of the optical fiber fixing member of the first example was measured with a stylus type configuration measuring device as follows:

A precision stage, constituted by an X-Y stage and a rotary stage, was used as a sample mounting base, and a sample fixing jig was fixed onto the rotary stage. Also used was the fixing jig, which has a black top surface, in the same manner as the aluminum plate of the third example. The optical fiber fixing member was fixed onto the fixing jig while the V-shaped groove direction was set substantially perpendicular to a scanning direction of a stylus. Additionally, to observe the V-shaped groove bottom face, the microscope was mounted parallel with the V-shaped groove direction and tilted upward by 45 degrees relative to the V-shaped groove bottom face, and light was radiated to the V-shaped groove bottom face from the vertical direction.

First, while looking into the microscope, the stylus is dropped to the V-shaped groove bottom face. Subsequently, the Y-stage is operated to move the optical fiber fixing member in a direction perpendicular to the scanning direction of the stylus. In this case, if the V-shaped groove direction is not accurately perpendicular to the stylus scanning direction, a tip end of the stylus is disengaged from the V-shaped groove bottom face by operation of the stage. In the case where the tip end of the stylus is disengaged from the V-shaped groove bottom face, the rotary stage is finely adjusted to adjust the direction of the optical fiber fixing member until the stylus cannot be disengaged from the V-shaped groove bottom face. For an observed image of the optical fiber fixing member reflected in the microscope, only the flat portion of the V-shaped groove bottom face is reflected black and it is therefore easy to distinguish a boundary position of the V-shaped groove inclined and bottom faces. Therefore, orientation is also easily performed. By the aforementioned direction adjustment, the direction in which the optical fiber engaging portion extends, i.e., the V-shaped groove direction can accurately be obtained, an error of squareness of the V-shaped groove direction and the stylus scanning direction can be set to 0.64 degree or less, and the stylus scanning direction can be accurately adjusted.

By operating the X-stage, the surface of the optical fiber engaging portion is traced perpendicular to the groove direction with the stylus, to measure an outline sectional configuration of the optical fiber engaging portion. Subsequently, the obtained outline sectional configuration is analyzed with analysis software to obtain accuracy in pitch and depth of the optical fiber engaging portion. Since the squareness of the V-shaped groove direction of the optical fiber engaging portion and the stylus scanning direction is accurately matched, an allowable error in measurement can be 0.1 µm or less.

FIFTH EXAMPLE

Figure 5A:
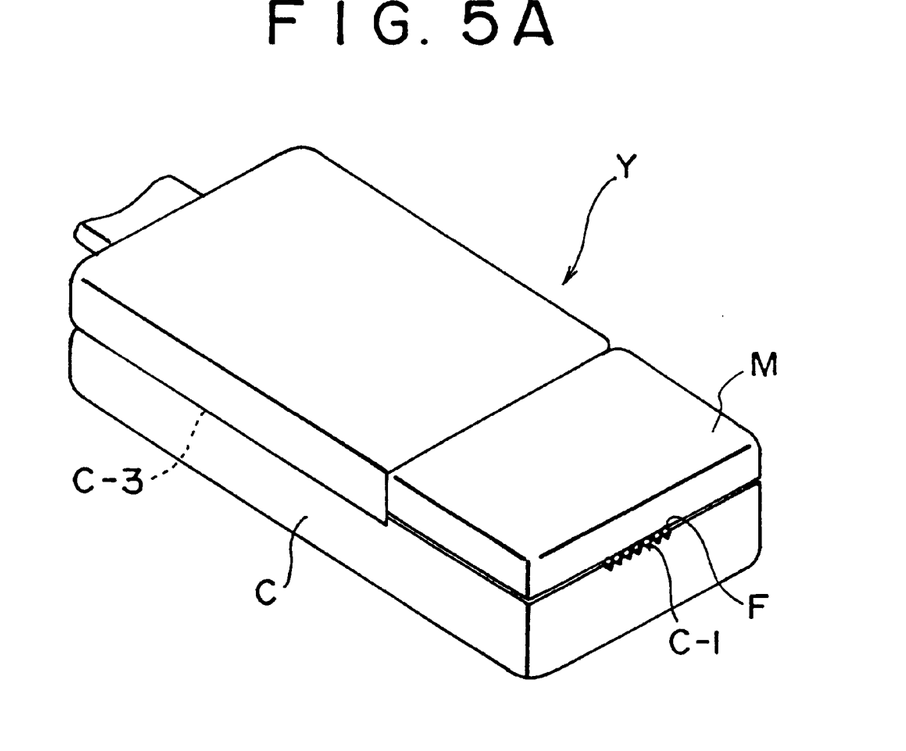
FIG. 5A is a perspective view.
Figure 5B:
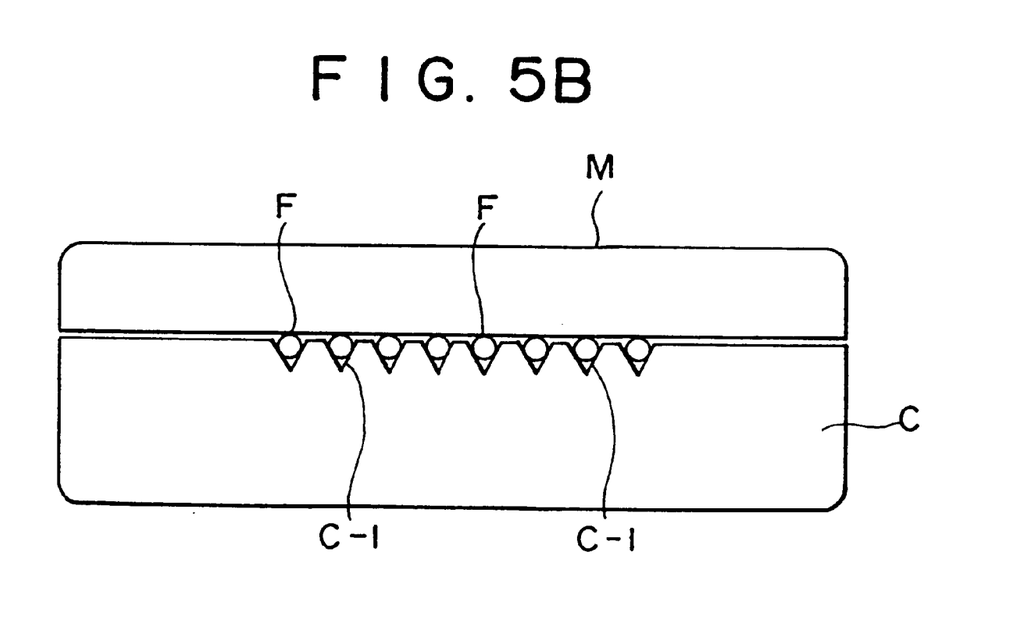
FIG. 5B is a front view.
Figure 6:
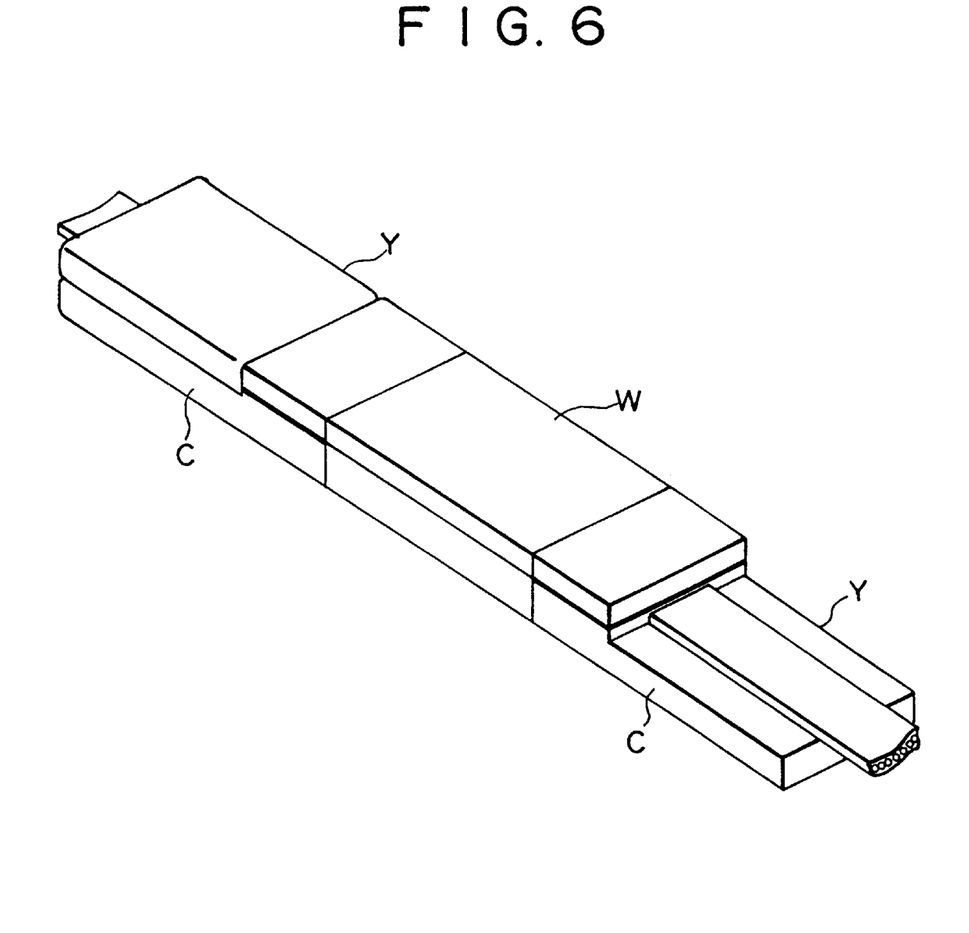
FIG. 6 is a perspective view of an optical waveguide module of an embodiment.

As shown in FIG. 5, the optical fiber fixing member of the first example was used, and a single-mode optical fiber F was engaged/disposed in each optical fiber engaging portion C-1 of the optical fiber fixing member C. The optical fibers were held using a lid M of a transparent glass, and fixed with an adhesive of an ultraviolet-setting resin. Subsequently, end faces of the optical fibers fixed by the optical fiber fixing member C and the lid M were abraded together with end faces of the optical fiber fixing member and the lid to prepare an optical fiber array Y. For the optical fiber array, in the same manner as the second and third examples, the bottom face of the optical fiber engaging portion could easily be distinguished, and it could easily be confirmed that the position of the engaged/fixed single-mode optical fiber was not deviated from the optical-axis direction. Furthermore, as shown in FIG. 6, by connecting the optical fiber array Y and an optical waveguide element W to optically connect the optical fiber and an optical waveguide, an optical waveguide module was obtained.

For the optical fiber array and the optical waveguide module obtained in the examples, an optical axis extends accurately along the direction of the optical fiber engaging portion not only in the optical fiber end-face position but also in at least the vicinity of the optical fiber end faces arranged in an end face of the array or the module.

According to the present invention, the center of the optical fiber engaging portion is obtained with high accuracy by optical measurement or stylus measurement. As a result, an optical fiber fixing member for easily manufacturing an optical fiber array can be obtained.

Moreover, by using the optical fiber fixing member, an optical fiber array or an optical waveguide module can be obtained in which it can easily be examined whether the optical fiber is positioned in the center of the optical fiber engaging portion of the optical fiber fixing member in the vicinity of the optical fiber input/output end portion and in which the optical axis extends accurately along the direction of the optical fiber engaging portion, not only in the optical fiber end-face position but also in at least the vicinity of the optical fiber end faces arranged in an end face of the array or the module.

Additionally, according to the method of measuring dimensional accuracy of the present invention, the dimensional accuracy in pitch and depth of the optical fiber engaging portion of the optical fiber fixing member can accurately be measured.

What is claimed is:

1. An optical fiber fixing member for positioning/engaging an optical fiber end portion comprisings:
   an optical fiber engaging portion having two inclined faces, for supporting a side wall of said optical fiber end portion, and a bottom face positioned between said two inclined faces,
   wherein said bottom face is flat and has a surface roughness Ra of 1.0 $\mu$m or less, and
   wherein inclinations of said bottom face and said inclined faces are discontinuous at a portion where said bottom face and said inclined faces are connected in a sectional face vertical to an optical axis of an optical fiber supported by said inclined faces.

2. The optical fiber fixing member according to claim 1, wherein a plurality of optical fiber engaging portions are arranged, and flat bottom faces of the optical fiber engaging portions are positioned in the same plane.

3. The optical fiber fixing member according to claim 1, wherein said optical fiber fixing member is formed of a moldable material.

4. The optical fiber fixing member according to claim 3, wherein said material is selected from the group consisting of a glass material, a polymer material, and a composite material consisting of the polymer material and an inorganic filler.

5. An optical fiber array comprising:
   the optical fiber fixing member as claimed in claim 1;
   an optical fiber engaged in said optical fiber engaging portion; and
   a lid for pressing a side wall, of the optical fiber engaged in said optical fiber engaging portion, to hold said optical fiber end portion together with said optical fiber fixing member,
   wherein at least said optical fiber fixing member is transparent.

6. An optical waveguide module comprising:
   the optical fiber array as claimed in claim 5; and
   an optical waveguide element optically connected to said optical fiber array.

7. An optical fiber fixing member for positioning/engaging an optical fiber end portion comprising:
   an optical fiber engaging portion having two inclined faces, for supporting a side wall of said optical fiber end portion, and a bottom face positioned between said two inclined faces,
   wherein said bottom face is flat, and a reflective film and/or a reflection preventive film is selectively formed on said inclined faces and said bottom face in such a manner that, when the optical fiber engaging portion is observed while a light is radiated to said bottom face from above or from below, contrast of said bottom face and said inclined faces by a reflected light or a transmitted light is enhanced.

8. The optical fiber fixing member according to claim 7, wherein said optical fiber fixing member is formed of a moldable material.

9. The optical fiber fixing member according to claim 8, wherein said material is selected from a group consisting of a glass material, a polymer material, and a composite material consisting of the polymer material and an inorganic filler.

10. An optical fiber array comprising:
    the optical fiber fixing member as claimed in claim 7;
    an optical fiber engaged in said optical fiber engaging portion; and
    a lid for pressing a side wall, of the optical fiber engaged in said optical fiber engaging portion, to hold said optical fiber end portion together with said optical fiber fixing member,
    wherein at least said optical fiber fixing member is transparent.

11. An optical waveguide module comprising:
    the optical fiber array as claimed in claim 10; and
    an optical waveguide element optically connected to said optical fiber array.

12. The optical fiber fixing member according to claim 7, wherein a plurality of optical fiber engaging portions are arranged, and flat bottom faces of the optical fiber engaging portions are positioned in the same plane.

* * * * *